(12) United States Patent
Sha et al.

(10) Patent No.: US 7,165,786 B1
(45) Date of Patent: Jan. 23, 2007

(54) NON-NEWTONIAN FLOW FLUID-LOCKING MECHANISM FOR VEHICLES

(75) Inventors: Subin Sha, Coldwater, MI (US); Joseph Spencer, Coldwater, MI (US); Brian Bowerman, Quincy, MI (US)

(73) Assignee: Douglas Autotech Corporation, Bronson, MI (US)

( * ) Notice: Subject to any disclaimer, the term of this patent is extended or adjusted under 35 U.S.C. 154(b) by 0 days.

(21) Appl. No.: 10/169,664

(22) PCT Filed: Dec. 20, 1999

(86) PCT No.: PCT/US99/30431

§ 371 (c)(1),
(2), (4) Date: Jul. 8, 2002

(87) PCT Pub. No.: WO00/37298

PCT Pub. Date: Jun. 29, 2000

Related U.S. Application Data

(60) Provisional application No. 60/113,084, filed on Dec. 21, 1998, provisional application No. 60/164,438, filed on Nov. 9, 1999.

(51) Int. Cl.
*B60D 1/18* (2006.01)

(52) U.S. Cl. .................. 280/775; 74/493; 280/779

(58) Field of Classification Search ................ 280/777, 280/775, 779; 74/493
See application file for complete search history.

(56) References Cited

U.S. PATENT DOCUMENTS

| 3,487,712 | A | 1/1970 | Steiner |
|---|---|---|---|
| 3,948,339 | A | 4/1976 | Iwanaga |
| 4,096,930 | A | 6/1978 | Viscardi |
| 4,507,982 | A | 4/1985 | Turner et al. |
| 5,259,487 | A | 11/1993 | Petek |
| 5,277,281 | A | 1/1994 | Carlson et al. |
| 5,284,330 | A | 2/1994 | Carlson et al. |
| 5,332,260 | A | 7/1994 | Heinrichs et al. |
| 5,419,581 | A | 5/1995 | Schafer et al. |
| 5,449,199 | A | 9/1995 | Heinrichs et al. |
| 5,492,312 | A | 2/1996 | Carlson |

(Continued)

*Primary Examiner*—Eric Culbreth
(74) *Attorney, Agent, or Firm*—Kane & Co., P.L.C.

(57) ABSTRACT

An assembly is provided for fixing the position of an adjustable component (22) of a vehicle, comprising in combination a fixed reference frame (20) within the vehicle such as a dash or a firewall, an adjustable component (22) also disposed in the vehicle such as an adjustable steering column (10), pedals, or a seat. Interconnecting the fixed reference frame (20) and the adjustable component (22) is a fluid locking mechanism (50) which permits selective positioning of the adjustable component relative to the fixed reference frame (20) and holds the adjustable component (22) in position. The fluid locking mechanism (50) is preferably a non-Newtonian flow fluid locking mechanism which uses a magneto-rheological fluid (97) to fix the position of the adjustable component (22) in place once the desired position is selected. To provide additional safety for the vehicle occupants, the fluid locking mechanism may be controlled by an electrical microprocessor (556) or circuit which adjusts the locking strength of the fluid locking mechanism (50) based upon user inputs and dynamic events.

15 Claims, 6 Drawing Sheets

U.S. PATENT DOCUMENTS

| | | |
|---|---|---|
| 5,547,019 A | 8/1996 | Iacullo |
| 5,652,704 A | 7/1997 | Catanzarite |
| 5,693,004 A | 12/1997 | Carlson et al. |
| 5,711,746 A | 1/1998 | Carlson |
| 5,816,372 A | 10/1998 | Carlson et al. |
| 6,279,952 B1 * | 8/2001 | Van Wynsberghe et al. .......... 280/777 |
| 6,296,280 B1 * | 10/2001 | Struble et al. .............. 280/777 |
| 6,514,001 B1 * | 2/2003 | Yezersky et al. ........ 403/109.1 |

* cited by examiner

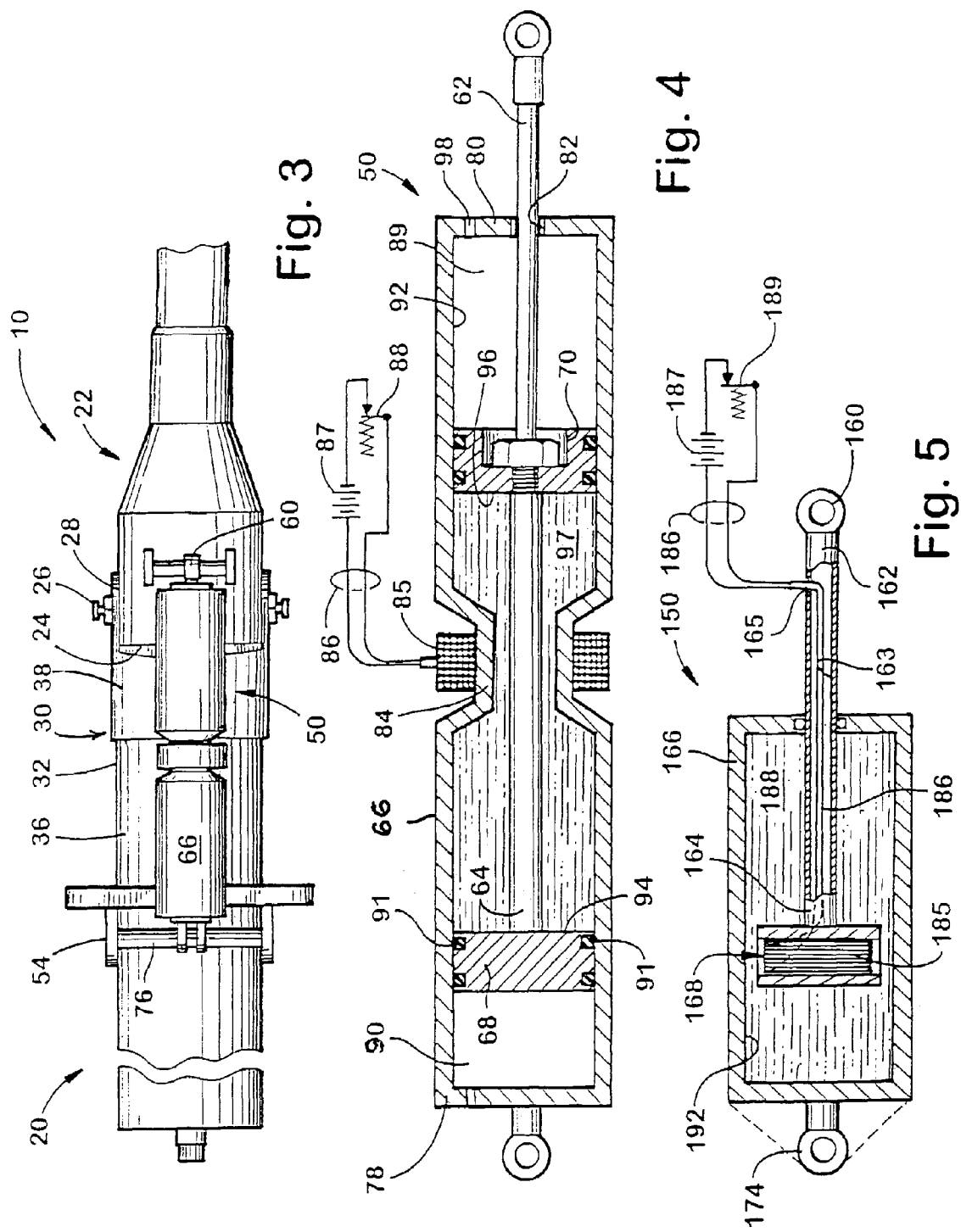

NON-NEWTONIAN FLOW FLUID-LOCKING MECHANISM FOR VEHICLES

CROSS REFERENCE TO RELATED APPLICATIONS

This application claims priority from and is a continuation of PCT application serial number PCT/US99/30431, filed Dec. 20, 1999, which claims priority from U.S. provisional patent application Ser. Nos. 60/113,084 filed Dec. 21, 1998, and 60/164,438, filed Nov. 9, 1999, the contents of which are incorporated herein by reference.

BACKGROUND OF THE INVENTION

1. Field of the Invention

This invention relates generally to devices for adjusting the position of one object relative to another and more particularly to a fluid-locking mechanism for fixing the position of one object relative to another, such as automobile seats, control pedals, the tilt and telescope position of a steering column, and the like.

2. Discussion of the Related Art

Traditionally, adjustable components in a vehicle have been temporarily fixed in position using mechanical locking systems. Such systems included some pawl, detent, or similar structure engaging a slot tooth, or similar structure. This has certainly been the case with adjustable vehicle steering columns. To better accommodate different operators and to make it more comfortable to operate the vehicle, articulated and telescoping steering columns, adjustable seats, and more recently, adjustable control pedals, have been devised so that the user orient the controls to positions best suited for their personal needs and comfort. The ability to adjust the relative position of a vehicle control element for the operator has been recognized as important in reducing driver fatigue and improving overall control of the vehicle. However, the mechanisms used to provide the adjustment over a limited range of positions; were subject to mechanical failure or wear, and were expensive to manufacture resulting in higher costs. Furthermore, once the particular control or object was in position, it remained fixed in an accident and presented a hazard to the operator. The instant invention provides an infinite number of adjustment positions, utilizes fewer mechanical components than prior devices resulting in lower costs, and permits repositioning of the objects in the event of an accident to reduce the chance of injury or death.

SUMMARY OF THE INVENTION

In a broad form of the invention, an apparatus is provided for interconnecting two objects together which permits the relative position of the two objects to be adjusted while the device is in a first state, but fix the relative position of the two objects while the device is in a second state. More particularly, the apparatus embodying the invention includes a housing having at least one movable piston inside. Also inside the housing is a non-Newtonian flow fluid which passes through at least one passage within the housing. Adjacent the passage, or in close proximity thereto, is a device for selectively generating or neutralizing a magnetic field in the area including the passage. The fluid within the housing flows through the passage when the magnetic field is weak or absent permitting the piston to move. When the magnetic field surrounding the passage reaches a predetermined strength, the fluid undergoes a change and ceases to flow, locking the relative position of the piston within the housing.

In another form, the apparatus embodying the invention is used to adjustably fix the relative position of a steering column. The novel assembly includes an upper housing assembly coupled to a lower housing assembly in a manner to permit at least one of the upper and lower housing assemblies to articulate, telescope and rotate relative to the lower housing assembly. At least one non-Newtonian flow fluid-locking mechanism interconnects the upper housing assembly to the lower housing assembly for selectively fixing their relative positions. It is contemplated the apparatus includes a device for producing a magnetic field condition around at least a portion of the non-Newtonian flow fluid-locking mechanism for selectively activating and deactivating the fluid-locking mechanism.

In another form of the invention, the non-Newtonian flow fluid-locking mechanism includes a cylinder which is attached to one of the upper and lower housing assemblies. Received in sliding engagement within the cylinder is at least one piston mounted to a shaft which extends from the cylinder and is attached to an opposite one of the upper and lower housing assemblies. Filling the cylinder and sealed, therein is a non-Newtonian flow fluid whose flow characteristics are selectively altered under the influence of a magnetic field. When a magnetic field is absent or weak, the fluid flows permitting the piston in the cylinder to move, and change the relative position of the upper housing assembly in relation to the lower housing assembly. When a magnet field of predetermined strength is present within the fluid, the fluid flow-state is altered, fixing the piston within the cylinder and thus the relative position of the upper housing assembly to the lower housing assembly. Mechanisms for generating or neutralizing a magnetic field within the fluid include permanent magnets, electro-magnets, wire coils, or combinations thereof.

In yet another form of the invention, it is contemplated that the invention may be used to lock the rotation of the steering column, and act as a vehicle anti-theft system. The system would not deactivate until the key was inserted or some other system releases the device. Additionally, it is contemplated that the invention may be used to fix the relative position of seats, control pedals, and other objects within a vehicle to properly position the operator in an ergonomic or comfortable position.

The advantages provided by the instant invention include a method and apparatus for selectively fixing the relative position of one object to another. Examples include changing the tilt angle and/or longitudinal position of a steering wheel with respect to the steering column. The compact nature of the instant invention reduces manufacturing times and costs associated with assembly because complex stampings, pawls, and slots are eliminated, resulting in fewer parts than conventional adjustable steering column assemblies, translating into lower cost. Additionally, the mechanism easily interfaces with other safety mechanisms to permit repositioning of the vehicle control components in the event of a crash to reduce the risk of injury to the operator. The mechanism may be adjusted to absorb some of the impact by the operator to reduce injury, or rapidly fall away from the operator to reduce the risk of contact entirely. It is contemplated that pre-positioning devices such as pyrotechnic actuators may be used in combination with this invention to reposition vehicle components such as the steering wheel and column in the event of an accident.

These and other objects, advantages, purposes and features of the invention will become more apparent from a study of the following description taken in conjunction with the drawing figures described below.

BRIEF DESCRIPTION OF THE DRAWING FIGURES

FIG. 3 is a bottom plan view of the invention shown in FIG. 2;

FIG. 4 is a schematic section view of one embodiment of the invention shown in FIGS. 2 and 3;

FIG. 5 is a schematic section view of an alternate embodiment of the invention shown in FIGS. 2 and 3;

DETAILED DESCRIPTION OF THE PREFERRED EMBODIMENTS

Figure 2:
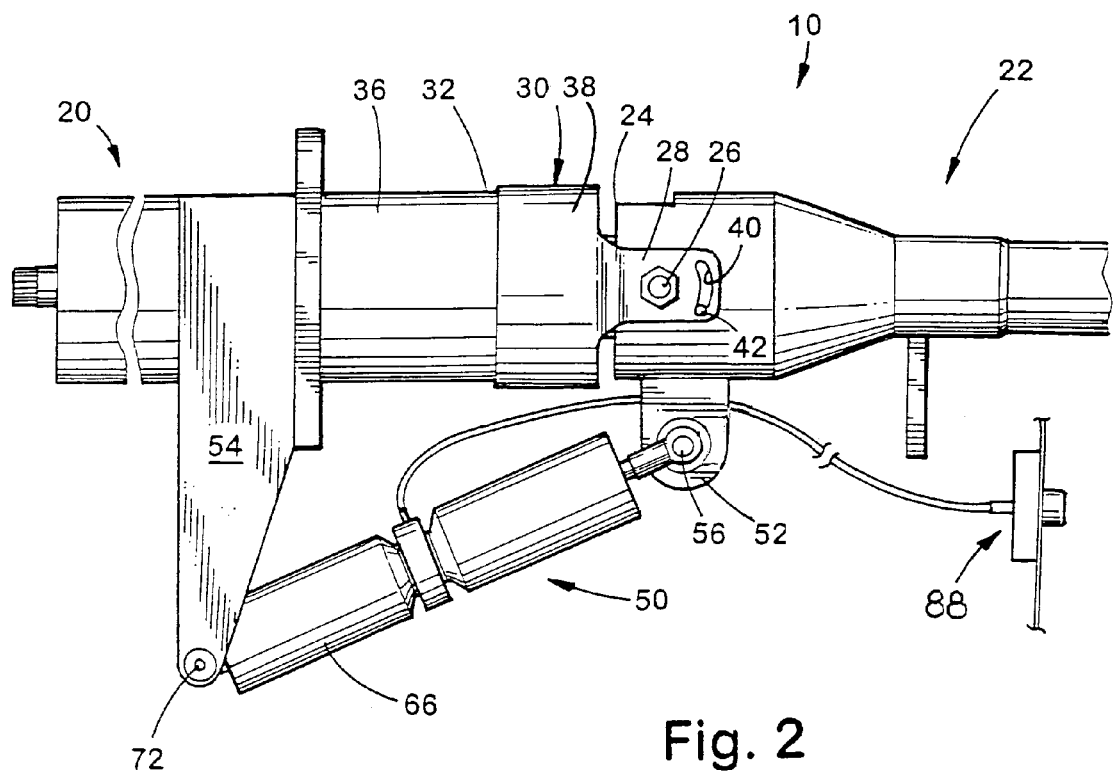
FIG. 2 is an enlarged elevation view of the invention shown in FIG. 1.

For purposed of the following description, the terms "upper", "lower", "right", "left", "rear", "front", "vertical", "horizontal" and derivatives thereof shall relate to the invention as oriented in FIG. 2. However, it is to be understood that the invention may assume various alternative orientations except where expressly specified to the contrary. It is also to be understood that the specific devices and processes illustrated in the attached drawings, and described in the following specification, are simply exemplary embodiments of the inventive concepts defined in the specification and any appended claims. Specific dimensions and other physical characteristics relating to the embodiments disclosed herein are not to be considered as limiting, unless the claims expressly state otherwise.

The instant invention has application to substantially any situation where it is desired to adjustably position one component relative to another. For the sake of simplicity, the following description is made in reference to applications in a vehicle, and more to a steering column where it is common to provide for rotation (tilt) and/or translation (telescoping) movement of one component (the steering wheel) relative to a fixed reference frame such as a panel, a floorboard, a vehicle frame, a brace, a strut, or the lower housing of an adjustable steering column intended to remain stationary under normal operating conditions. Adjustable control components in addition to the steering column include a brake pedal, a clutch pedal, a gas pedal, a seat bottom, a seat back, a headrest, and an armrest.

Figure 1:
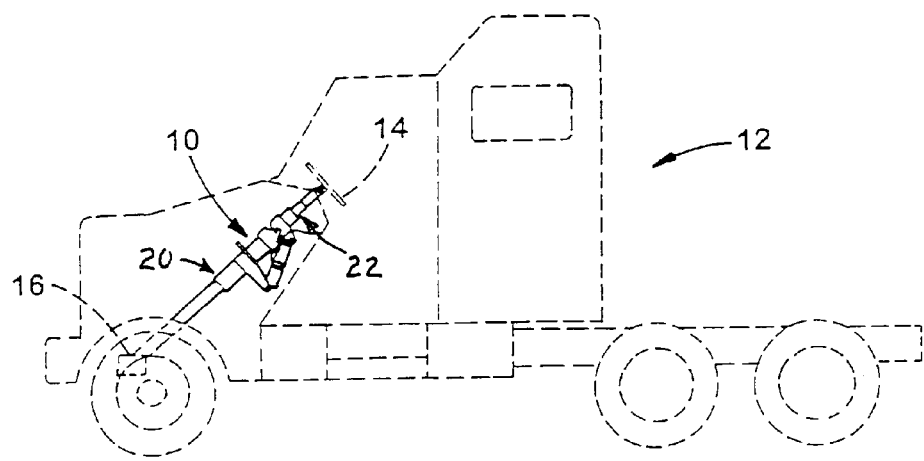
FIG. 1 is a schematic diagram of one environment of application of the instant invention.

Referring to drawing FIGS. 1 through 3, a steering column assembly 10 is shown mounted in a vehicle 12 such as a truck, wherein a steering wheel 14 is provided at one end, and the opposite end is interconnected to a steering gear box 16 for steering the front wheels of the vehicle. The upper portion of the steering column assembly 10 (FIG. 2) includes a stationary lower housing assembly 20 interconnected to the upper housing assembly 22 in a manner to permit articulation or tilting of the upper housing assembly relative to the lower housing assembly, translation or telescoping motion of the upper housing assembly relative to the lower housing assembly, or both. In the embodiment shown, upper housing assembly 22 is pivotally coupled at its lower end 24 by pins 26 to arms 28 of a yoke 30 attached to the upper end 32 of the fixed stationary lower housing 20. The pivot axis defined by pins 26 is preferably substantially horizontal to provide for a limited arc of rotation in a vertical plane.

The upper and lower housing assemblies 20 and 22 of the steering column assembly 10 enclose a series of interconnected rotatable shafts (not shown) connected at one end to the steering wheel assembly and at an opposite end to a steering gear box. A universal joint or similar coupling interconnects the shafts to permit tilt movement of the upper housing 22 relative to lower housing 20. A telescoping shaft may be attached to the upper shaft to permit longitudinal adjustment of the steering column assembly 10.

Lower housing assembly 20 generally includes a tubular member 36 preferably made from steel with a collar 38 securely attached to the upper end 32 by weldment or similar coupling. Arms 28 of a yoke 30 diverge and extend outwardly from a longitudinal axis of the lower housing to a distance sufficient to receive the upper housing 20 there between. Generally arcuate openings 40 are provided at the distal ends of each arm 28 to receive a guide pin 42 attached to the upper housing 22. The guide pins 42 interact with the arcuate openings 40 to define the tilt limits of the upper housing with respect to the lower housing. In the illustrated embodiment, arms 28 of the yoke 30 are stamped or otherwise formed from steel bar stock and have the lower ends welded to the collar 38 to produce a rigid fork attachment at the upper end 32 of the lower housing 20. Additional information and alternatives on the nature of the pivotal coupling between the upper housing 22 and the lower housing 20 are disclosed in U.S. Pat. No. 5,899,487, granted May 11, 1999, the contents of which are incorporated in their entirety herein by reference.

Referring to the embodiment shown in FIGS. 2 and 3, the lower and upper housing assemblies 20 and 22, respectively, are interconnected by locking mechanism 50, preferably at points vertically offset from the horizontal mid-line of the steering column assembly, and most preferably at a point far from the pivot access defined by pins 26. The upper housing 22 has at least one, and preferably two flanges 52 extending generally perpendicular at a point proximate the lower end 24 to define a bracket. A similar structure extends perpendicular from tubular member 36 or from collar 38 generally identified by reference numeral 54. Attached to bracket 52 by a pin 56 (see FIG. 2) is one end of the locking mechanism 50. The opposite end of the locking mechanism 50 is pivotally coupled to bracket 54.

FIG. 4 schematically illustrates an embodiment of a fluid-locking mechanism 50 used in combination with the instant invention. Locking mechanism 50 includes housing or cylinder 66, preferably in the shape of a right circular cylinder closed at end 78, and having an opening 82 at an opposite end 80 of sufficient diameter to permit the passage of piston shaft 62 there through. The central or intermediate portion 84 of housing 66 has a reduced intermediate portion (RIP) to create a constriction generally uniformly around shaft 62. The specific dimension of RIP 84 will vary depending upon the diameter of shaft 62. RIP 84 essentially divides the housing 66 into two chambers 89 and 90, each containing a respective piston 68 and 70. Pistons 68 and 70 each have a diameter substantially equal to the interior diameter of the respective chambers. O-rings or similar acting seals 91 may extend around the circumference of each piston to form a tight seal with the interior wall 92 of the chambers 89 and 90. A specific volume is defined between the interior surfaces 94 and 96 of the pistons 68 and 70 respectively, and the interior wall 92. Disposed within this volume is a non-Newtonian flow fluid 97 such as that disclosed in any one of U.S. Pat. Nos. 5,277,281; 5,284,330; 5,492,312; 5,816,372; and 5,711,746, all assigned to the Lord Corporation, the disclosures of which are incorporated herein by reference. The portions of the respective chambers outboard of the pistons 68 and 70 may be filled with ambient air passing through holes 98 extending through the walls of ends 78 and 80.

Disposed around cylinder housing 66 adjacent RIP 84 is a device for generating a magnetic field within the interior of the housing 66 and particularly across the inside diameter of RIP 84. In one embodiment, the device includes a wire coil 85 operably connected by conductors 86 to a power supply 87. The flow of current through conductors 86 and coil 85 is controlled by a switch 88 mounted either in the steering wheel, or a module mounted in or near the column and possibly activated by a lever. The actual mounting method or location is not important so long as it is reasonably accessible by the operator. In this embodiment, depression of switch 88 interrupts the power to coil 85. Alternatively, the device surrounding RIP 84 may include a split annular magnet. Each half of the magnet would be coupled to a mechanical linkage which would move each magnet toward or away from RIP 84 to engage and disengage the mechanism. In yet another form, permanent magnets may be mounted around RIP 84 of sufficient shape and size to produce a magnetic field or flux across the inside of RIP 84. Arranged around the outside of the magnets may be a wire coil similar to 85 coupled to a circuit by conductors. The circuit may be designed such that when activated, the electromagnetic force produced by the coil would counter the magnetic field produced by the magnets, canceling each other to produce a field-free region across RIP 84, and allowing the fluid to move between the chambers. All forms of the device are preferably operably connected to a crash sensor to interrupt the supply of power, disengage or neutralize the magnets to unlock the mechanism. In this manner, a substantial portion of the impact could be absorbed by the mechanism rather than by the occupant.

In operation, a bias on conductors 86 produced by the power supply 87 causes electromagnet 85 to produce a magnetic field within the non-Newtonian flow fluid 97 in chambers 89 and 90 and most particularly across the interior of the restriction produced by RIP 84 and the intermediate portion of shaft 62. The field causes the fluid within that region to alter a flow-state sufficient to prevent the fluid from passing through the RIP, and locks pistons 68 and 70 in place. This magneto-rheological condition firmly fixes the relative position of the shaft with respect to the housing which in turn fixes the relative position of the upper housing 22 with respect to the lower housing 20. In order to change the relative position of the upper housing, the operator depresses switch 88, a lever, or other input device to interrupt the field across RIP 84 and allowing the fluid to change state and flow through the passages defined between RIP 84 and shaft 62. By permitting the pistons to translate within the respective chambers, the operator can then change the relative position of the upper housing 22 with respect to the lower housing 20. Releasing the switch 88 restores the magnetic field which then in turn prevents the flow of fluid between the respective chambers. In the case of an electromagnet, the force necessary to change the position of the pistons may be varied, in essence fine tuning the locking mechanism. Resistance could be varied by changing the volume or size of the passage through which the fluid migrates as the piston moves. Other available modifications include changing the diameter of the pistons, or changing the diameter of the shaft 64 passing through the RIP. A change is one of more of these elements produces a change in the amount of force necessary to move the piston and attached shaft.

FIG. 5 illustrates an alternate embodiment of the fluid-locking mechanism 150 using a single piston design. The single piston design includes a shaft 162 having a connector 160 at one end which is configured to be coupled to brackets 52 or 54 using the same type of pin arrangement described earlier. The opposite end of the shaft 164 terminates in piston 168 which may include a coil of wire to form an electromagnet 185. The leads from the coil may extend up through a central hollow core 163 of the shaft 162 and exit a port 165 proximate the connector 160. There the conductors 186 are interconnected to a switch 189 and a power supply 187 which selectively energizes the coil 185.

Piston 168 and a portion of the shaft 162 are disposed within a chamber 188 defined by right circular cylinder 166. The external diameter of the piston 168 may vary in dimension from a size substantially equal to the inside diameter of the chamber 188 or be of a lesser size to control the dimension or space between the perimeter of the piston 168 and the interior wall 192 (hereafter the "perimeter volume") which provides the same function as RIP above. Chamber 188 of the housing 166 is filled with the non-Newtonian flow fluid. The entire chamber 166 is preferably sealed including the passage through which shaft 162 extends in order to prevent the fluid from leaking. Although single seals are shown in the drawing figure, it is anticipated that a number of redundant seals and bushings may be used to retain the fluid within the chamber 188 and provide a robust seal.

With the two connector ends 160 and 174 pivotally secured to the respective brackets 52 and 54, and with a bias supplied over conductors 186 to energize coil 185, the non-Newtonian fluid is unable to pass through the perimeter volume creating a condition where the piston 168 and shaft 162 are rigidly secured with respect to the cylinder or housing 166. Upon the operator's selection and depression of switch 189 and interruption of the power along conductors 186, the fluid state changes and passes about the periphery of the piston 168 to permit a change of position of the column. Although not shown, it is anticipated that piston 168 may substantially extend across and fill the interior of the cylinder of housing 166. In order to permit the passage of the fluid, ports may extend through the piston which could be metered using jets to adjust the resistance.

In both of the embodiments described above, the locking device is functioning in a Coulomb or Brigham lock, i.e., this configuration approximates an ideal lock in which the force generated is independent of piston velocity and large forces can be generated with low or zero velocity. This independence improves controllability of the lock making the force a function of the magnetic field strength, which is a function of the current flow in the circuit or the field strength produced by an adjacent magnet. In basic terms, the flow of magnetic flux is dependent on several factors in the flow path. The minimum lateral cross-sectional area of the piston head (68, 70 or 168) within the windings of the coil 185; the minimum lateral cross-sectional area of magnetically permeable material finding a return path from magnetic flux; and a surface area of the magnetic pull of the piston, all of which have values as defined in U.S. Pat. No. 5,284,330.

The instant invention may also be used to reduce the deceleration impact of the operator with the steering column in the event of a crash. This is accomplished by interrupting the circuit using a switch operably connected to a crash sensor in the vehicle. At the specified threshold, the sensor interrupts the bias in the circuit, thus deactivating the electromagnet and allowing the steering column to be repositioned. In a preferred embodiment, a pyrotechnic actuator may be attached to the bracket 52 on the lower side of upper housing 22 so in the event of a crash, the non-Newtonian flow fluid-locking mechanism is de-energized and the pyrotechnic pre-positioning system pulls the steering column downward and away from the operator so that the airbag within the steering wheel deploys to more fully absorb any impact.

Figure 6:
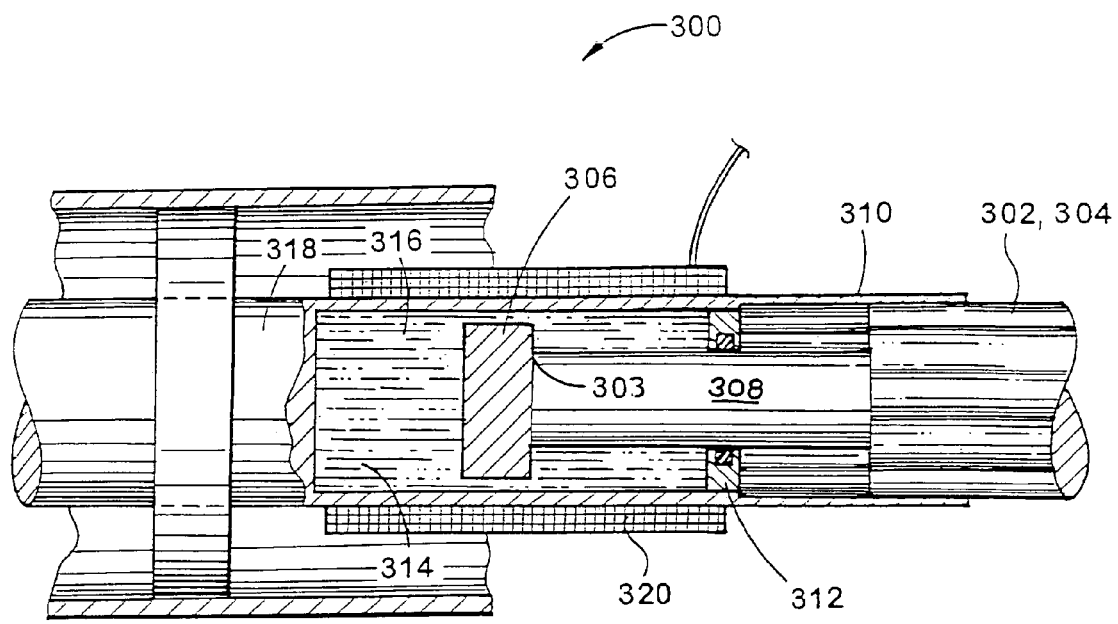
FIG. 6 is a schematic section view of on embodiment of the invention in a telescoping assembly.

In reference to FIG. 6, a portion of a telescoping steering column assembly 300 is shown comprising a shaft 302 configured at one end 304 to attach to the steering wheel. The opposite end 303 of the shaft terminates in a piston 306 having a diameter slightly less than the diameter of the shaft 302. The piston 306 is coupled to shaft 302 by a neck 308. Piston head 306 and the neck 308 of shaft 302 are received in a cylinder 310 closed by seal 312 to define a fixed volume 314 similar to that defined by the cylinder 166 and piston 168 in the embodiment shown in FIG. 5. The volume 314 is filled with the non-Newtonian flow fluid 316 to completely envelope the piston head 306 and the portion of the shaft 302 extending through the seal 312. The cylinder housing 310 may be formed in one end of solid shaft member 318 which forms the remaining portion of the shaft in the upper or lower housing. To prevent rotation of shaft 302 relative to lower shaft 318, splines may be provided along the upper interior or end of shaft 318 and above neck 308. The splines would permit axial translation, but fix the two shafts rotationally. The shaft 302 within cylinder 310 is preferably journaled by bearings well known in steering technology.

In this configuration, it is anticipated that an electromagnetic coil 320 may be disposed on the exterior portion of the upper end of the shaft 318 to create the magnetic flux in the fluid 316 disposed within the chamber 314 sufficient to prohibit the fluid from passing through or around the perimeter of the piston 308. In the alternative, it is contemplated that the shaft 302 may be hollow to provide a passage for conductors to a coil formed in the interior of the piston 306 to create the necessary magnetic flux. The circuit used may be similar to that described above and could be used in combination with the crash sensors that provide data so the relative telescoping position of the shaft 302 may be changed with respect to the lower shaft 318.

Figure 7:
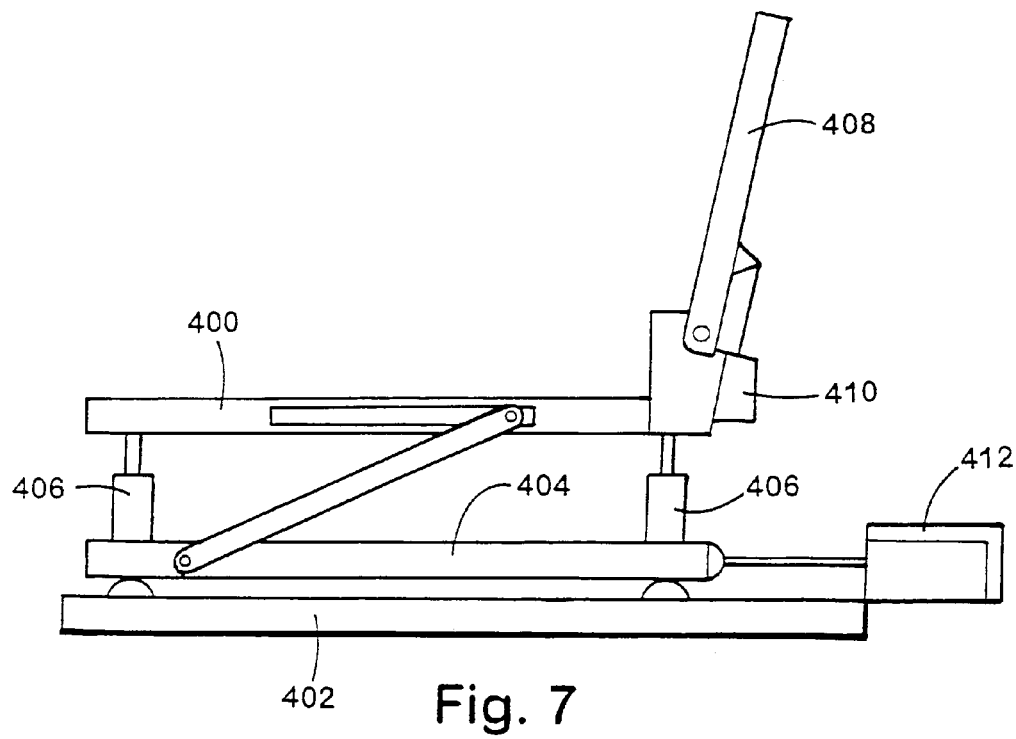
FIG. 7 is a schematic view of another application of the instant invention.

In yet another embodiment of the invention, the non-Newtonian flow fluid locking mechanism may be used to control the relative height, recline angle of a seat back and seat base; as well as the horizontal position of the seat with respect to the steering wheel. FIG. 7 schematically illustrates these various other applications. For example, the seat base 400 may be supported above a track 402 and mounted to a carriage 404 by a plurality of the locking devices generally identified as 406. In addition, the angular position of the seat back 408 may be controlled by a locking device 410 interconnected to the back 408 and the base 400. Lastly, horizontal travel of the carriage may be controlled by a locking device 412 mounted at one end to the floor or frame of the vehicle and at the opposite end to the carriage 404. Just as in the previous embodiments, one or all of these locking devices 406, 410, and 412 may be used to set the relative position of the seat components. In addition, pyrotechnic propositioning systems may be integrated to change the position of the seat in a crash.

Figure 8:
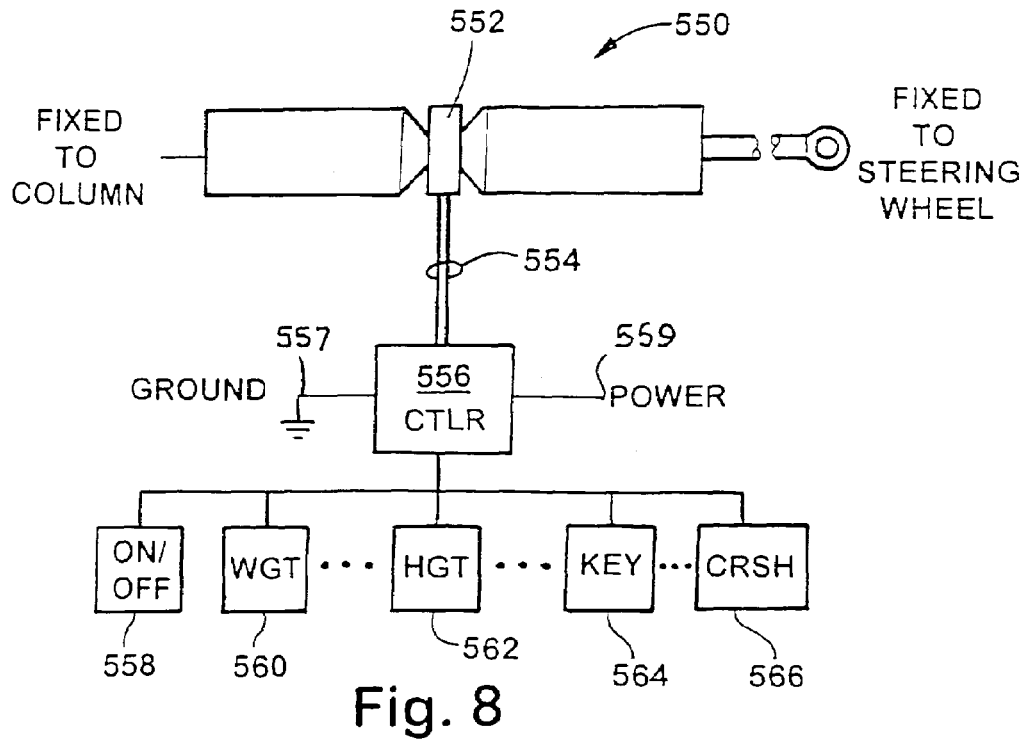
FIG. 8 is a schematic diagram illustrating a circuit used in combination with the instant invention to adjust the characteristics of the invention in response to specific input.

It was briefly mentioned above that the instant invention may be used to reduce the impact of the occupant with the steering wheel in the event of a crash. FIG. 8 shows, in schematic form, one assembly for achieving that function. In this embodiment, the locking device 550 includes a coil 552 operably coupled by conductors 554 to a controller 556 (CLR) which, in turn, is operably coupled to a ground 557 and a power source 559 for the circuit. Controller 556 has a plurality of inputs, including, but not limited to, a tilt adjustment switch 558, a weight sensor 560, a height sensor 562, an ignition sensor 564, and a crash sensor 566. Additional sensors could include accelerometers for indicating the direction of an impact and for measuring the speed of the vehicle.

Controller 556 may be a microchip, programmable logic controller, micro computer or other processor capable of receiving data provided by the various sensors to determine the necessary current applied over conductors 554 to control the strength of the magnetic field produced by coil 552. That is to say the controller 556 would dynamically change the locking characteristics in accordance with the various inputs so any impact by the operator is absorbed by the column rather than by the occupant. In addition, this same circuitry could include memory circuit for recalling particulars about a particular incident; for example, the system may be able to indicate whether the operator was traveling a certain speed, and direction, and whether the seat belt was in use. The system could also record the impact direction and force. All of this information would be useful in determining the facts surrounding an accident. This same controller 556 may also include information stored by the operator on the preferred position of the column, the control pedals, the seat position and the like.

Figure 9:
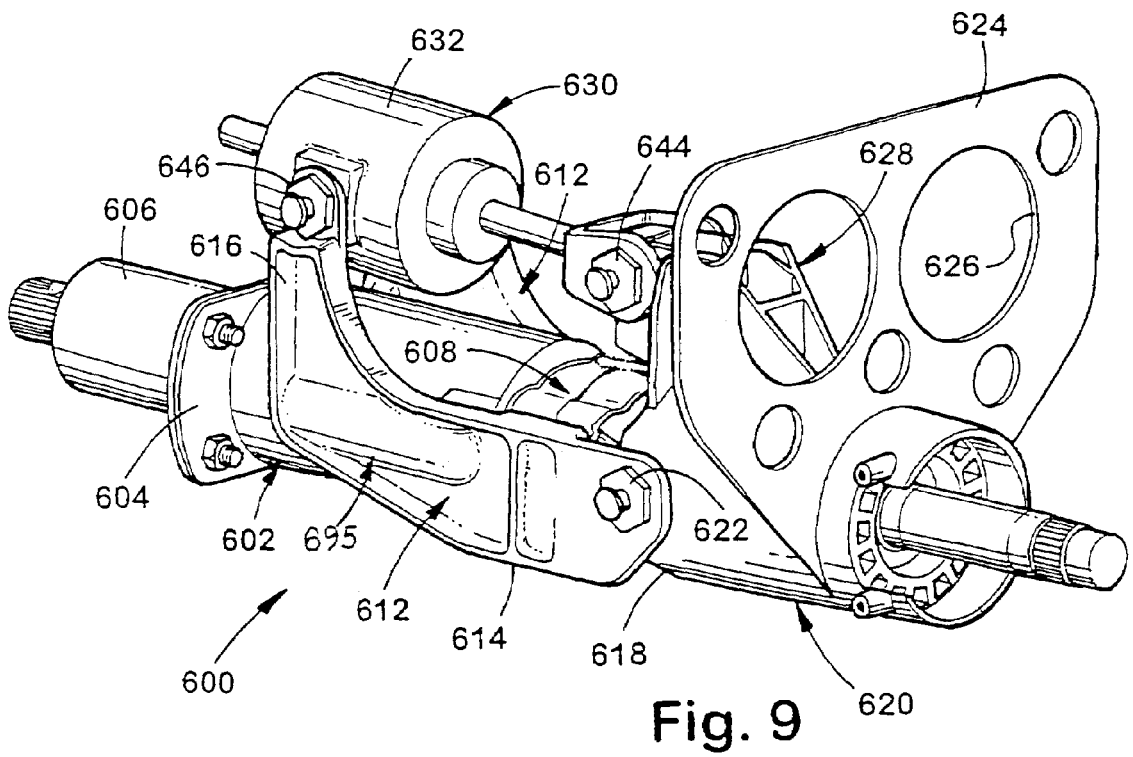
FIG. 9 is an oblique view of a tilting and telescoping steering column employing other embodiments of the instant invention.

FIG. 9 illustrates a steering column assembly 600 incorporating [in] the instant invention in a tilting column as well as a telescoping column. The steering column assembly 600 includes a lower housing assembly 602 which is intended to be secured by flanges 604 to a rigidly secured section 606 of the steering column which, in turn, may be attached to the fire wall, dash assembly, or other rigid structure in the vehicle. The interior of the lower housing assembly 602 is designed to receive a telescoping inner housing assembly or shuttle 608. The inner housing assembly or shuttle 608 is configured to slide within the lower housing 602 between an extended or retracted position along an axis parallel to the longitudinal axis of the lower housing assembly 602. Shuttle 608 may be of a particular shape received within a correspondingly shaped passage formed in the interior of the lower housing assembly with bearing surfaces provided to allow a smooth translation of the inner housing with respect to the lower housing. An end of the inner housing extending from the lower housing assembly 602 may be fitted with a pair of brackets 612, each disposed on opposite sides of the inner housing. Each bracket 612 may be generally L-shaped or dog-legged such that one portion of the leg 614 is securely attached to the end of the inner housing assembly 608, and the other portion of leg 616 extends at an angle to leg 614 and generally tangential to the exterior of the lower housing assembly 602.

Figure 10:
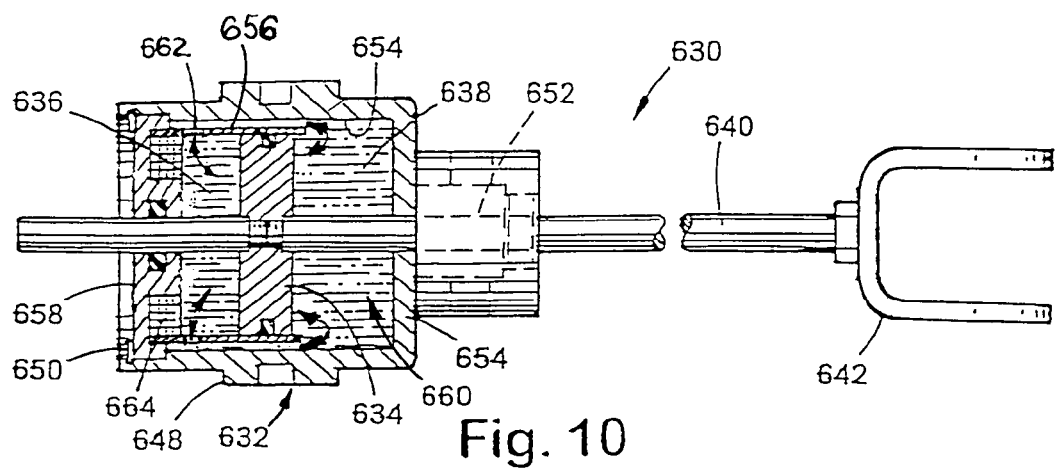
FIG. 10 is an elevation section view of the invention shown in FIG. 9.

Pivotally coupled between the ends of legs 614 may be the lower end 618 of the upper housing assembly 620. The coupling could permit articulating motion of the upper housing assembly 620 with respect to the lower housing assembly 602 about an axis generally horizontal and defined by bolts 622. For specifics on the coupling between the bolts and the attached components, the reader is referred to U.S. Pat. No. 5,899,497 issued on May 4, 1999, the specification of which is incorporated herein by reference. In the embodiment shown in FIG. 9, the upper housing assembly 620 also includes a bracket 624 of a predetermined dimension having a plurality of cutouts 626 to receive various gauges. Also extending from the housing 620 proximate the lower end 16 is a buttressed flange 628. Flange 628 is interconnected to the legs 616 of each bracket 612 by a fluid locking mechanism identified by the reference numeral 630. A more detailed illustration of the fluid locking mechanism 630 is made with respect to FIG. 10.

Fluid locking mechanism 630 includes a housing 632 having at least one piston 634 slidably disposed therein to define at least two chambers 636 and 638. Extending from the piston is a piston shaft 640 which extends from the housing 632 and terminates in a clevis 642. The clevis 642 may be pivotally attached to the buttressed flange 628 by one or more bolts 644 (See FIG. 9). Housing 632 is also similarly pivotally attached to the ends of the legs 616 by bolts 646 extending through the legs and into mounting plates 648 formed on the exterior of the housing 632. With the fluid locking mechanism 630 in the unlocked state, the upper housing 620 is permitted to tilt or pivot about the coupling point defined by bolt 622. The pivotal couplings provided by bolts 644 and 646 permit the angular orientation of the fluid locking mechanism 630 to vary as the upper housing 620 is moved about the pivot point.

Referring again to FIG. 10, housing 632 is preferably cylindrical and opened at one end 650 to permit the insertion of various components therein. A piston shaft 640 extends through a sealed opening 652 defined in the opposite end 654 of the housing 632. Concentrically disposed in the interior 654 of the housing 632, and spaced inwardly away from the interior walls of the housing 632 is an inner sleeve 656 which has an inside diameter approximately equal to the outer diameter of the piston 634. The inner sleeve 656 is retained in position by one or more shoulders at each end of the housing or from the end cap 658 received within the end 650 of the housing 632. The end cap 658 is sealed in position using C-clips and seals conventional in the art. The interior of the housing 632, the chambers 636 and 638 and the volume between the inner sleeve 656 and the inner wall 654 of the housing are filled with the non-Newtonian flow fluid 660. The fluid in chamber 636 is permitted to flow into chamber 638 through perforations or spaces 662 located in sleeve 656, and through the peripheral volume between the sleeve 656 and the inner wall 654. The flow of fluid from one chamber to the other may be controlled in a number of ways. Primarily the rate of fluid exchange is determined by the size of the smallest opening, defined either by the passages 662 or the cross-section of the peripheral passage between inner wall 654 and sleeve 656. The locking power of the mechanism is controlled in substantial respect by the intensity of the magnetic field or flux existing in those small areas. In the instant invention, a coil 664 is provided which generates an electromagnetic field upon the application of a particular current. Alternatively, permanent magnets may be used in place of coil 664, the field of which may be neutralized by the application of an electromagnetic field by a coil proximate the magnets. Although the electromagnetic field is described as occurring at one end of the sleeve 656, the electromagnetic force or field may be produced at other areas of the locking mechanism to change the flow state of the fluid 660. For clarity, the type of fluid used in the fluid locking mechanism is substantially similar to the fluid described above, and available from the Lord Corporation mentioned above. By varying the magnetic flux, the flow-state or characteristic of the fluid 660 is changed. In one state, the fluid is unable to pass through the small perforations 662, essentially trapping the remainder of the fluid within the respective chambers, and fixing the relative position of the piston 634 within the housing. Thus to change the relative tilt angle of the upper housing 620 with respect to the lower housing assembly 602, the operator simply removes the electromagnetic field present within the fluid locking mechanism.

Figure 11:
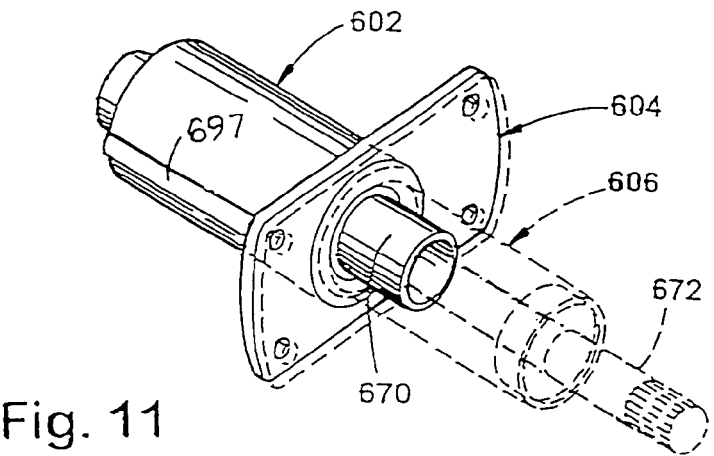
FIG. 11 is an oblique view of an embodiment of the instant invention used for translation of components.
Figure 12:
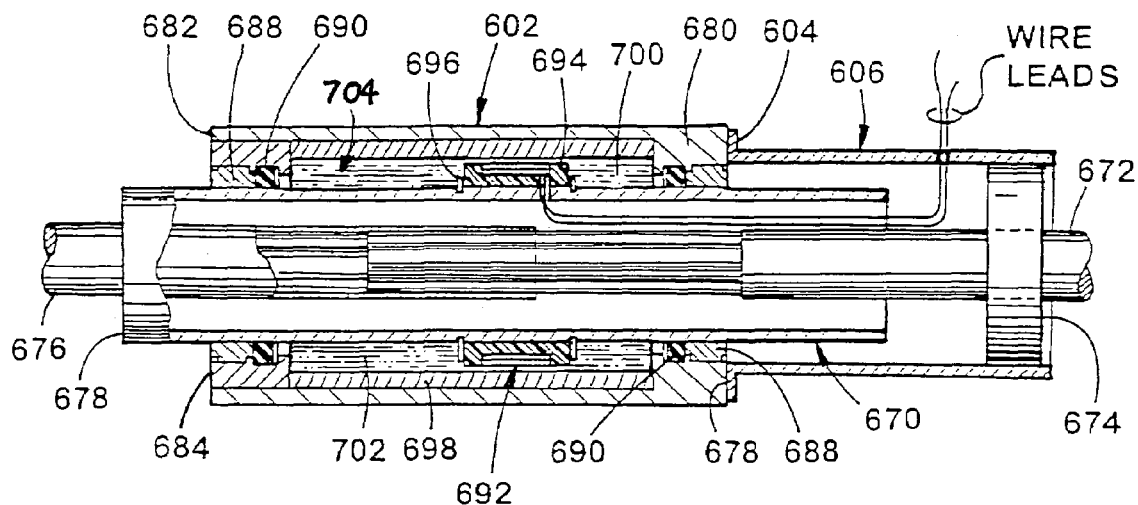
FIG. 12 is a longitudinal section view of the invention shown in FIG. 11.
Figure 13:
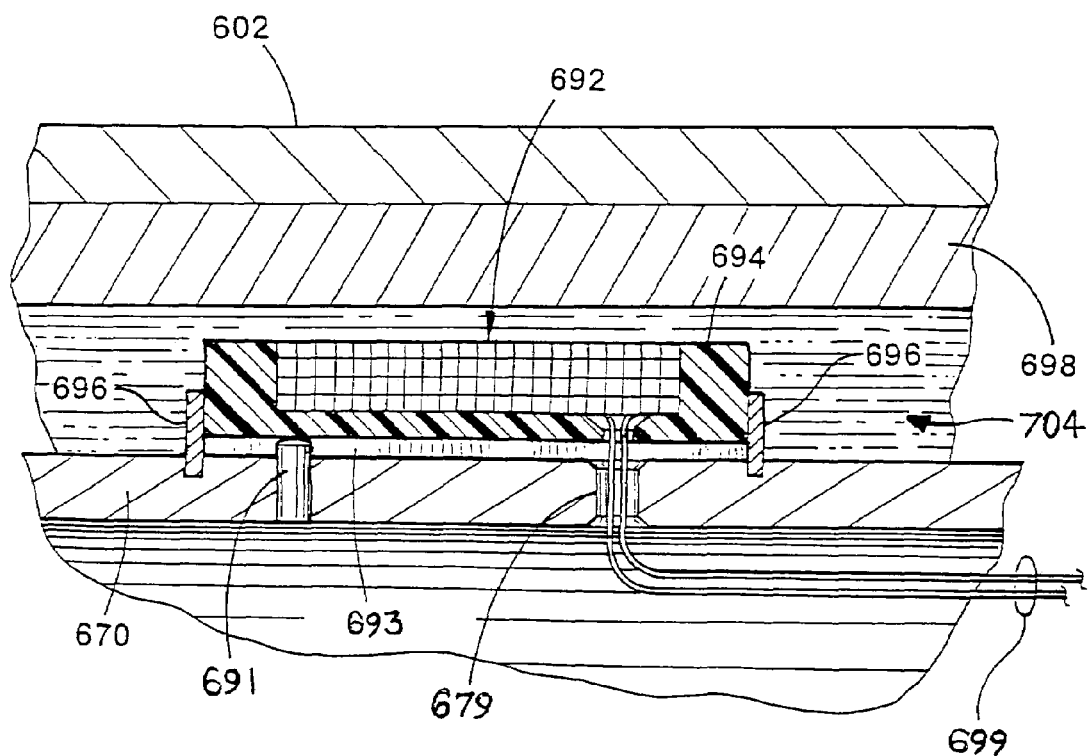
FIG. 13 is an enlarged view of a portion of FIG. 12.

FIGS. 11 through 13 illustrate another embodiment of the fluid locking mechanism, particularly as it applies to fixing the translation, or telescoping position of two components—in this case, the telescoping steering column. FIG. 11 schematically illustrates the lower housing assembly 602 in relation to the lower rigid structure 606 and the interconnecting flanges 604. Extending longitudinally through the lower housing 602 is an inner tubular member identified by reference numeral 670 which is configured to translate longitudinally with respect to the lower housing 602. For the purposes of illustration, component 670 may be equivalent to the shuttle or inner housing assembly 608. Extending concentrically through the inner tubular member 670 may be a telescoping shaft 672 passing through bearing 674 and extending a predetermined distance into the tubular member 670. In a preferred embodiment, the portion of shaft 672 extending within the tubular housing 670 is splined longitudinally. Telescopically received over the splined end is a second shaft 676 having a female coupling complimentary in shape to the splined end of the shaft 672. Shaft 676 is intended to extend through the opposite end of the tubular member 670 and may be supported by a bearing within end 678 or elsewhere along its length. End 678 of the tubular member 670 may be also configured to be interconnected to the brackets such as 612 described above by an adapter member not shown received over the end. The attachment member for interconnecting the end 678 of the tubular member 670 to the brackets 612 may be of sufficient diameter such that the brackets 612 are located generally parallel and adjacent the exterior the housing 602.

It is contemplated that housing 602 may be generally tubular, and substantially closed at one end 678 by an end wall 680. The opposite end 682 may be closed by a removable end cap 684. Both the end wall 680 and the end cap 684 may have openings or passages defined therein to receive the tubular member 670 there through. Conventional seals and bushings may be provided such as 688 and 690 to provide a fluid-tight seal around the tubular member 670.

Intermediate on tubular member 670 (FIGS. 12 and 13) may be an electromagnetic coil or magnet 692 seated in an armature 694 which is retained generally in place by snap rings 696 seated in groves at each end of the armature 694. In the case of a wire coil mounted on the armature 694, a hole 679 is provided in the armature to allow the wire leads 699 to extend there through and through the tubular members 670 for connection to the circuit. To prevent the armature from rotating around the tubular member 670, a pin 691 may be provided, extending from the tubular member 670, and received in a slot 693 formed in the underside of the armature to fix the rotation of the armature relative to the tubular member 670. A similar arrangement may be used, if desired, to fix the relative rotational position of the inner tubular member 670 with respect to the housing 602. Alternatively, mechanisms exterior tube 670 may prevent rotation. For example, it is contemplated that each bracket 612 may have a slotted structure such as suggested by reference numeral 695 (FIG. 9) which rides over and is engaged by a cam such as suggested by reference numeral 697 (FIG. 11).

Disposed within the interior of the housing 602 shown in FIG. 13, may be an inner sleeve 698 which has an outside diameter approximately equal to the inside diameter of the housing 602 and is positioned between the end wall 680 and the end cap 684. The inner diameter of the sleeve 698 may vary, but in no event is it less than the outside diameter of the armature 694 and that of the magnet or electromagnetic coil 692. In a preferred embodiment, the inside diameter of the sleeve 698 is such that a small gap approximately on the order of 1 to 2 millimeters or less is present between the outside diameter of the armature 694 and the inside diameter of the sleeve 698. In this fashion, a narrow passage exists between the chamber 700 and chamber 702. The two chambers and the narrow passage interconnecting the two chambers is filled with the non-Newtonian fluid 704 similar to that described above.

When an electromagnetic field exists across the gap between the chambers 700 and 702, the fluid 704 within that gap, and to a certain degree in each chamber, changes states from a conventional fluid to a more viscous material which is unable to flow through the gap. The particular flow-state of the fluid prevents the exchange of fluid between the respective chambers and thus locks the armature, and the tubular member 670 in position with respect to the housing 602. When the electromagnetic field is neutralized, or removed, the non-Newtonian fluid 704 reverts to its natural state, and permitted to flow across the gap from one chamber to the other when tabular member 670 is translated. To the extent that shaft 676 also moves with respect to the tubular housing 670, the spline ends of shafts 676 and 672 permit the relative telescopic adjustment.

In each of the embodiments described above, it is preferred that a non-ferrous material be used for the various components which are substantially adjacent or in close proximity to the magnetic/electromagnetic components. The use of non-ferrous materials prevents the polarization or magnetization of those components which would result in the continued presence of a magnetic field, thus possibly impacting the function of the locking mechanism. Acceptable materials would include bronze, aluminum, and polymeric materials.

Various changes, alternatives and modifications will become apparent to those of ordinary skill in the art following a reading of the foregoing description. For example, although electromagnets have been described, it will be appreciated that permanent magnets may be utilized to provide some or all of the magnetic field. The intensity or strength of the magnetic flux through the fluid may be changed by altering the distance of the magnet from the RIP or cylinder. It is further contemplated that the instant invention may be adapted for use in controlling the rotation of a steering wheel shaft, or similar structure using a device described in U.S. Pat. Nos. 5,492,312; 5,711,746; and 5,816,372 issued in the name of the Lord Corporation. With the advent of electrical steering systems, it is also contemplated that these devices could be used to provide adjustable tactile feedback through the steering wheel to provide the operator with a range of steering control settings. In yet another application, the locking mechanism may be operably coupled to a force sensor located in the steering wheel of the vehicle via a computer. The sensor would generate a signal which would be processed by the computer to vary the flux in the locking mechanism during an accident wherein the locking mechanism would accommodate and absorb some of the energy resulting from the impact of the occupant with the steering wheel. Lastly, a different implementation of the locking system would include adjusting the relative position of structures such as seats and structures such as instrument panels and the like. It is intended that all such changes, alternatives and modifications has come within the scope of the foregoing description be considered as part of the present invention.

We claim:

1. An apparatus for selectively fixing a relative position of an adjustable steering column, comprising in combination:
   a first housing having a lower end;
   a second housing mounted to said lower end of said first housing to permit at least one of an articulating and telescoping position of said first housing with respect to said second housing; and
   at least one non-Newtonian flow fluid-locking mechanism interconnecting said first housing to said second housing and selectively fixing said at least one of said articulating and telescoping position of said first housing with respect to said second housing.

2. The apparatus as defined in claim 1, further including an assembly for selectively changing the presence of a magnetic field condition around at least a portion of said at least one non-Newtonian flow fluid-locking mechanism for selectively activating and deactivating said at least one non-Newtonian flow fluid-locking mechanism.

3. The apparatus as defined in claim 2, wherein said at least one non-Newtonian flow fluid-locking mechanism includes:
   a third housing coupled to one of said first and second housings;
   at least one piston disposed within said third housing and defining at least a first and a second chamber within said third housing;
   a shaft extending from said at least one piston and from said third housing, said shaft having an end coupled to an opposite one of said first and second housings;
   a non-Newtonian flow fluid filling said third housing; and
   at least one passage within said third housing in fluid communication with said at least said first and second chambers selectively permitting a transfer of said non-Newtonian flow fluid between said at least said first and second chambers.

4. The apparatus as defined in claim 2, wherein said non-Newtonian flow fluid-locking mechanism controls a tilt angle of said first housing with respect to said second housing.

5. The apparatus as defined in claim 2, wherein said non-Newtonian flow fluid-locking mechanism controls a telescoping position of said first housing relative to said second housing.

6. The apparatus as defined in claim 2, wherein said non-Newtonian flow fluid-locking mechanism is exterior said first and second housings.

7. The apparatus as defined in claim 2, wherein said non-Newtonian flow fluid-locking mechanism is co-axial with at least one of said first and second housings.

8. An assembly for selectively positioning a component of a vehicle, comprising in combination:
   a fixed reference frame;
   an adjustable component;
   a non-Newtonian flow fluid locking mechanism interconnecting said fixed reference frame and said adjustable component.

9. The assembly as defined in claim 8, wherein said adjustable component includes at least one of a steering column, a steering wheel, a brake pedal, a clutch pedal, a gas pedal, a seat bottom, a seat back, a headrest, and an armrest.

10. The assembly as defined in claim 8, wherein said fluid-locking mechanism includes:
a housing;
at least one piston disposed within said housing and defining at least two chambers;
a piston shaft extending from said piston and out from said housing;
a fluid within said housing and in communication with said at least two chambers by at least one passage; and
a device for selectively changing a magnetic field condition across said at least one passage;
wherein one of said housing and said piston shaft is attached to said fixed reference frame and an opposite one of said piston shaft and said housing is attached to said adjustable component.

11. The assembly as defined in claim 8, further including an assembly operably coupled to said fluid-locking mechanism for controlling said fluid-locking mechanism based on at least one input from a device located remotely from said fluid-locking mechanism.

12. A method for selectively positioning an adjustable component in a vehicle, comprising in combination:
providing a stationary reference on the vehicle;
providing an adjustable component proximate said stationary reference;
interconnecting said adjustable component to said stationary reference by a fluid-locking mechanism;
placing said fluid-locking mechanism in one of said first and second states substantially instantaneously upon an input from at least one sensor within the vehicle; and
said fluid-locking mechanism permitting selective adjustment of said adjustable component relative to said stationary reference in a first state, and locking said adjustable component in a selected position relative to said stationary reference in a second state.

13. The method as defined in claim 12, further including the steps of controlling said fluid-locking mechanism based on at least one input from a device within the vehicle.

14. The method as defined in claim 12, wherein the step of providing a stationary reference on the vehicle includes selecting a component of the vehicle intended to remain fixed under normal operating conditions including a vehicle instrument panel, a portion of a vehicle steering column, a vehicle floorboard, and a vehicle frame.

15. The method as defined in claim 12, wherein the step of providing an adjustable component proximate said stationary reference includes:
selecting at least one of a tilt steering column, a telescoping steering column, an acceleration pedal, a brake pedal, a clutch pedal, an adjustable seat, an adjustable seat back, an armrest, and a headrest.

* * * * *